United States Patent
Barcin et al.

(10) Patent No.: US 8,348,498 B2
(45) Date of Patent: Jan. 8, 2013

(54) PROCEDURE FOR CHECKING THE FUNCTIONALITY OF AN ELECTRIC HEATING DEVICE

(75) Inventors: Buelent Barcin, Stuttgart (DE); Jan Kaluza, Boeblingen (DE); Michael Gerlach, Marbach A.N. (DE); Horst Kleinknecht, Fichtenberg (DE)

(73) Assignee: Robert Bosch GmbH, Stuttgart (DE)

( * ) Notice: Subject to any disclaimer, the term of this patent is extended or adjusted under 35 U.S.C. 154(b) by 564 days.

(21) Appl. No.: 12/622,454

(22) Filed: Nov. 20, 2009

(65) Prior Publication Data
US 2010/0134120 A1 Jun. 3, 2010

(30) Foreign Application Priority Data
Dec. 2, 2008 (DE) .......... 10 2008 044 271

(51) Int. Cl.
*G01K 15/00* (2006.01)
*G01K 13/00* (2006.01)
(52) U.S. Cl. .......... 374/1; 374/141
(58) Field of Classification Search .......... 374/1, 4, 374/5, 16, 54, 57, 141–145, 185, 208
See application file for complete search history.

(56) References Cited

U.S. PATENT DOCUMENTS

| | | | | |
|---|---|---|---|---|
| 1,885,048 A | * | 10/1932 | Slough | 73/301 |
| 3,750,155 A | * | 7/1973 | Oman | 374/185 |
| 5,243,953 A | * | 9/1993 | Fuchs | 123/557 |
| 5,649,515 A | * | 7/1997 | Fuchs et al. | 123/557 |
| 6,406,806 B1 | * | 6/2002 | Keskula et al. | 429/432 |
| 6,455,180 B1 | * | 9/2002 | Mowery et al. | 429/432 |
| 7,912,360 B2 | | 3/2011 | Gschwind | |
| 2004/0151955 A1 | * | 8/2004 | Keskula et al. | 429/13 |
| 2009/0107988 A1 | * | 4/2009 | Kaastra | 374/185 |
| 2010/0134120 A1 | * | 6/2010 | Barcin et al. | 324/537 |

FOREIGN PATENT DOCUMENTS
DE 10234561 2/2004
GB 2257749 1/1993

* cited by examiner

*Primary Examiner* — Yaritza Guadalupe-McCall
(74) *Attorney, Agent, or Firm* — Merchant & Gould P.C.

(57) ABSTRACT

A procedure for checking the functionality of an electric heating device (10) with at least one PTC-element (13, 14) is suggested. The electric heating device (10) is operated at a battery voltage. When controlling the heating device (10) it is impinged with a current and at least one measuring value is detected, which represents the current that flows through the heating device. The measuring value for the current is compared to at least one reference value with a default tolerance width while considering the battery voltage. In the case of a measuring value that deviates from the reference value an error can be assumed.

7 Claims, 2 Drawing Sheets

PROCEDURE FOR CHECKING THE FUNCTIONALITY OF AN ELECTRIC HEATING DEVICE

This application claims benefit of Serial No. 10 2008 044 271.2, filed 2 Dec. 2008 in Germany and which application is incorporated herein by reference. To the extent appropriate, a claim of priority is made to the above disclosed applications.

TECHNICAL FIELD

The present invention relates to a procedure for checking the functionality of an electric heating device with at least one PTC-element.

BACKGROUND

Different liquid operating means, as for example fuel, are required for the operation of motor vehicles, which have to be stored in the motor vehicle. In particular at diesel motor vehicles the so-called SCR-procedure (selective catalytic reduction) can be used for the pollutant emission reduction, which requires an aqueous urea-water solution (HWL) as further operating means. The urea-water solution is required as reducing agent, which is injected into the exhaust gas pipe demand-oriented and which enables together with a SCR-catalytic converter the reaction of nitric oxides in the exhaust gas to harmless water and nitrogen.

The aqueous urea-water solution is kept and stored in a so-called HWL-tank. However the freezing point of a usual 32.5% urea-water solution is generally at −11° C., so that the urea-water solution freezes at a corresponding weather. Therefore it is necessary to provide a tank heater in the HWL-tank.

A usual tank heater consists of electric heating elements, so that an electric current can be converted into heat. Therefore two ohmic heating elements can be for example provided, which are switched in series. Those elements can be combined with positive temperature coefficient thermistors, so-called PTC-elements. Positive temperature coefficient thermistor comprise current conducting materials, which conduct the current better at lower temperatures than at higher temperatures. The electric resistance increases with an increasing temperature, so that the created thermal output sinks with an increasing temperature and a "self-regulations" of the heating element takes place. A qualifying HWL-tank heater can for example be built by two parallel interconnected PTC-elements, which are arranged between two ohmic heating elements that are switched in series.

A standard exhaust gas after-treatment requires a liquid urea-water solution, so that the function of the tank heater that is built into the HWL-tank has to be maintained. Usually an electric diagnosis or functionality checking of such an electric heating device takes place by controlling the heating device by a familiar power switch, which impinges the heating device with a certain load current. The power switch reports a current mirror (sens-current) of the load current back to a control unit. With the aid of the sens-current the functionality of the heating device can be checked. This electric diagnosis of heating device is however relatively inaccurate and can cause misdiagnoses. In particular at a sinking sens-current for example the type of the disorder, for example the power break of a PTC-element, cannot be clearly recognized. The reasons for that are usually based amongst other in the parallel switching or the switch connection of the PTCD-elements. Furthermore the individual PTC-elements have high tolerances in the range of approximately 30%. Also the sens-current, which is reported by the power switch, provides in particular at low current mirrors high tolerances and inaccuracies. In addition to that there are different environmental conditions of the fluid that is present in the tank, for example different fluid levels and pressures as well as the dynamic behavior of the PTC-elements at different tank temperatures.

For diagnosing or checking the functionality of an electric heating element in a fuel tank the German application DE 102 34 561 A1 suggests to use the characteristic current course curve of a PTC-element in order to be able to signalize a defect by detecting the strength of the heating current that flows through the PTC-element during a certain period of time compared to a default threshold value. However this procedure does not provide a satisfying solution if more than one heating element, thus in particular a heating element connection has to be checked, because in particular at parallel interconnected PTC-heating elements no clear statements can be made about the type and location of the disorder. Furthermore the current flow in the heating device underlies significant deviations, so that wrong statements can be easily made at this procedure.

The invention has therefore the task to provide a procedure for a reliable functionality checking of an electric heating device in order to be able to ensure that for example the required heating power can be produced at a HWL-tank. The procedure according to the invention shall in particular diagnose whether individual or several heating elements are disabled in its performance at parallel interconnected PTC-elements and for example have dropped or short-circuited.

SUMMARY

Advantages of the Invention

This task is solved by a procedure for checking the functionality of an electric heating device with at least one PTC-element.

The procedure according to the invention serves for checking the functionality of an electric heating device, which comprises at least one PTC-element. The electric heating device is operated at a battery voltage. At the procedure the heating device is impinged with current or a load current. For checking the functionality at least one measuring value is detected, which represents the current that flows through the heating device. According to the invention it is provided that the at least one measuring value for the current is compared to at least one reference value under consideration of the battery voltage and that in the case of a deviation from the measuring value and the reference value an error is assumed. For the comparison of the measuring value and reference value a default tolerance width or a tolerance band is provided in order to cause no misdiagnoses at slight variances. By considering the battery voltage the checking of the functionality takes place with the aid of a performance curve of the heating device.

The invention is initially based on the idea that the characteristic current course curves of PTC-elements can serve as basis for the diagnosis of a heating device and of individual heating elements. In a characteristic way the current flow increases continuously at a heating device with PTC-elements after turning it on. Simultaneously the temperature increases by the heating effect of the heating device. That causes an increase of the electric resistance in the PTC-element by the self-heating in the crystal interior of the element, so that after reaching a maximum current peak the current is regulated back again. This characteristic current course curve of the PTC-elements is used according to the invention to check the functioning of the heating device and the PTC-elements. Therefore actually detected measuring values, which represent the total current or the current mirror that flows through the heating element, are detected and compared to reference values. Because the voltage that is applied at the heating device has a significant influence upon the total current and carries out the maximally possible heat output it is provided according to the invention that the voltage, which is for example provided as battery voltage in motor vehicles, has to be considered during the comparison of the measuring values with the reference values. Preferably one or several measuring values are therefore detected, which represent the total current, for example the sens-current itself, the voltage or the resistance are measured. At the same time the actual battery voltage is detected. Depending on the value of the actual battery voltage a suitable reference value is used, which is compared to the measuring value for the total current. In the case of a deviation of measuring and reference value an error is assumed and preferably a corresponding error signal is released. Thereby it is possible to consider the maximally possible heat performance that depends on the battery voltage.

The battery voltage in the system can vary and fluctuate a lot depending on different factors. When activating for example different components or consumers of the system as for example the motor vehicle, the current that flows through the heating device can be significantly reduced. Also the winter operation or a defect generator can cause a reduced battery voltage. On the other side the battery voltage can fluctuate as such, for example at a lacking loading of the battery. It influences also the current that flow through the heating device. According to the invention the actual battery voltage is therefore detected and considered in order to be able to make reliable statements about the functionality of the electric heating device and in particular about the PTC-elements. Depending on the actual battery voltage corresponding reference values are especially used for the procedure according to the invention.

In a preferred embodiment of the procedure according to the invention it is provided that for the comparison of measuring value and reference value the maximum current peak of the total current is used. The use of the maximum current peak as measuring value is particularly good because this value can be very simply and errorless determined. Therefore a sens-current, which represents the total current that flows through the heating device, can be continuously read for example after the activation time of the heating device or after the impinging of the heating device with a load current. The read value is always compared to the next read value. If the actual value is higher than the previous value the old value is overwritten. This procedure is repeated until the maximum current peak is reached. The current peak is reached when the previous value is higher than the actually measured value. Thereby the maximum current peak can be detected and used according to the invention for comparing it with a reference value.

The reference value mirrors the current that flows through the heating device with a certain tolerance width at a functioning heating device. The reference value can for example refer to the maximum current peak of the total current. In other embodiments current courses above the time with suitable tolerance bands can be stored as reference values, which mirror the characteristic current course of functioning heating devices or of functioning PTC-elements.

It is particularly advantageous that the heating device is a heating device for a tank, for example a tank for storing reducing agent, in particular aqueous urea-water solution (HWL). Especially at diesel motor vehicles a reduction of nitric oxides is possible by a selective catalytic reduction in a so-called SCR-catalytic converter in the exhaust gas pipe. Usually an aqueous urea-water solution is used as reducing agent, which is stored and carried along in a so-called HWL-tank. Because usual urea-water solutions freeze at approximately −11° C. such a tank has to be equipped with a heating device. Such heating devices provide usually PTC-elements, in particular a PYC-switch connection. The procedure according to the invention qualifies advantageously for the diagnosis or checking of the functionality of such electric heating devices, because parallel interconnected PTC-elements can be diagnosed with this procedure. The procedure according to the invention considers the board voltage or the actual battery voltage, which is applied for operating the electric heating device. Because the battery voltage significantly influences the total current that flows through the heating element and the heat output, the reliability of the checking of the functionality and therefore the security for the exhaust gas after treatment can be significantly improved with the procedure according to the invention.

In a preferred embodiment of the invention different reference values are used at different tank temperatures. PTC-elements show different dynamic behaviors at different temperatures. Therefore it is possible in this embodiment of the invention to avoid misdiagnoses that are based on that. A certain reference value for the maximum current peak is preferably stored for different possible temperatures in the tank. For all possible temperatures corresponding values can for example be stored in the form of a characteristic field. In other embodiments individual discrete reference value can be stored for certain temperatures, which are used for the default temperature ranges, in which the actually measured temperature falls. When implementing the procedure according to the invention the actual tank temperature is detected in this embodiment, for example by measuring with a suitable temperature sensor, which is arranged in the tank, or by using other parameters, as for example the exterior temperature or the time of the year. Subsequently a corresponding reference value is used and compared to the measured value.

In a further advantageous embodiment of the procedure according to the invention the detected measuring values, which lie within the tolerance width or tolerance band or the reference value and which therefore imply a diagnosis to be "errorless", are used for updating the reference values. Thereby it is avoided that for example age-related slight wear in the heating device, which cause a slightly reduced performance, but still guarantee a full functionality, do not cause a repeated diagnosis of an "error". In so far the procedure according to the invention can be adjusted to regularly occurring ageing processes of the heating device, as long as the functionality of the heating device is thereby not limited.

The invention furthermore comprises a computer program, which carries out all steps of the procedure according to the invention, if it runs on an arithmetic unit or a control unit. Finally the invention comprises a computer program product with a program code, which is stored on a machine-readable device, for implementing the described procedure according to the invention, if it is carried out on an arithmetic unit or a control unit.

Further advantages and characteristics of the invention arise from the subsequent description of the embodiments together with the description of the drawings. The different characteristics can thereby be realized either in combination together or each by itself.

DETAILED DESCRIPTION

Figure 1:
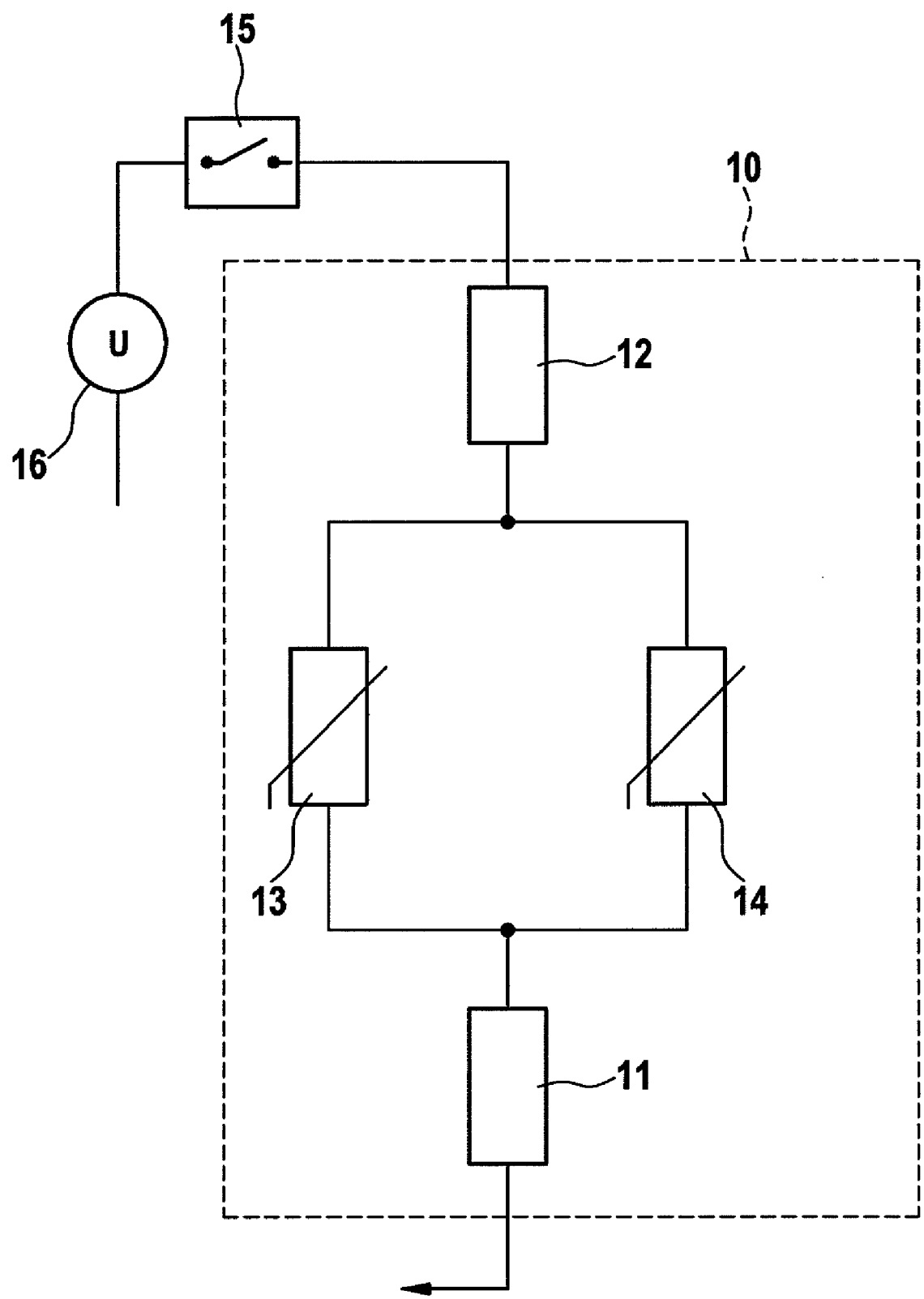
FIG. 1 is a heating switching of a usual electric heating device.

FIG. 1 shows a switching assembly of a usual electric heating device 10 from the state of the art. The heating device comprises two ohmic heating elements 11 and 12, which are switched in series, as well as two PTC-elements 13 and 14, which are switched parallel between the ohmic heating elements 11 and 12. By a power switch (BTS) 15, which is fed by a battery 16, the heating device 10 is impinged with a load current. The power switch 15 reports a current mirror of the load current back to a control unit (not shown). This current mirror or sens-current can amount for example at a load current of 10 ampere to 1 m-ampere. Due to the characteristic features of the PTC-elements 13 and 14 as positive temperature coefficient thermistor a self-regulation of the heating device 10 takes place by an increase of the resistance of the PTC-element 13, 14 at an increasing temperature, so that after reaching a maximum current peak the current flow sinks again.

The performance of the heating device 10 depends not only on the current flow but also on the applied voltage. The applied voltage is determined mainly by the actual voltage of the battery 16. According to the invention it is therefore provided, to consider the actual battery voltage at an electric checking of the functionality of the heating device 10.

According to the invention the checking of the functionality of the electric heating device 10 takes place by detecting the sens-current while impinging the heating device 10 with load current. The sens-current or the detected measuring values are compared to reference values while considering the battery voltage, which mirror the expected current values for a certain battery voltage at a functioning heating device. Thereby the characteristic current course of PTC-elements is used for the diagnosis.

Figure 2:
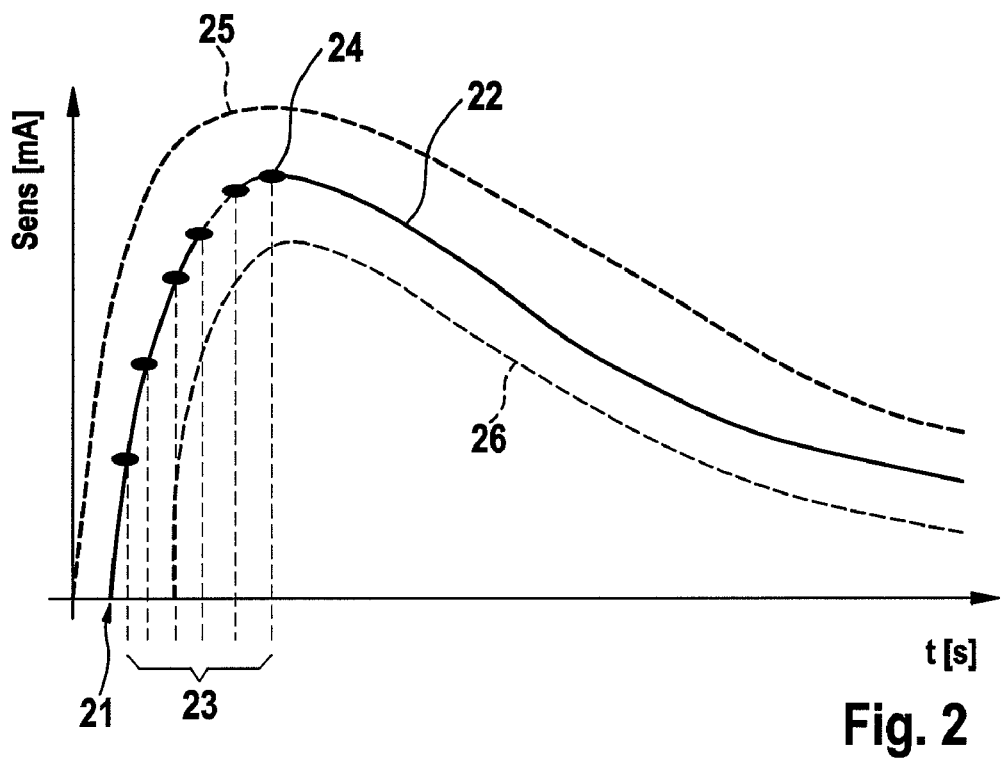
FIG. 2 is a time course of the sens-current at a functioning heating device.

A switch connection of two parallel interconnected PTC-elements is here as an example. It is also possible to use the procedure according to the invention at a heating device with only one PTC-element or with several, in particular several parallel interconnected PTC-elements. FIG. 2 shows a typical sens-current 22 above the time, which can be expected at a functioning heating device. After controlling the heating device 10 or impinging it with load current at the point of time 21 a sens-current is read back. At two consecutive points of time 23 measuring values of the sens-current are detected. Thereby preferably the actually received value is compared to the previous value. This procedure is repeated until the actual measuring value is higher than the previous measuring value. By doing so the maximum current peak 24 can be detected. The reference value or values are shown by an upper tolerance band 25 and a lower tolerance band 26. If the measuring values 22 at the points of time 23 and/or the maximum current peak 24 lie within the tolerance bands 25 and 26 it can be assumed that the PTC-elements and the heating device do work properly.

Figure 3:
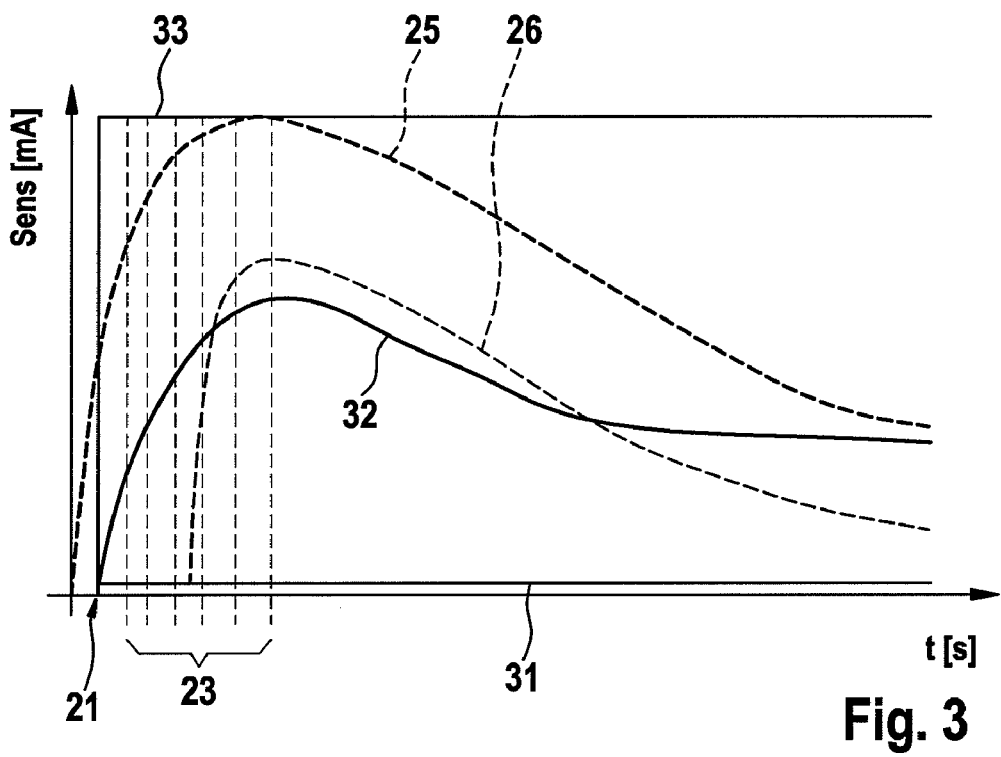
FIG. 3 is a time courses of the sens-current at not functioning heating devices.

FIG. 3 shows sens-current courses above the time, which allow the assumption of a not functioning heating device. The point of time 21 describes again the impinging of the heating device with load current. The upper and lower tolerance bands 25 and 26 illustrate the area of the reference values. At the point of time 23 the sens-current is detected. The thereby detected alternative current courses 31, 32 and 33 or each maximum current peak, which can partially not be detected, are outside the tolerance bands 25 and 26, so that a not functioning heating device can be assumed. The current course 31 mirrors in particular that the line has dropped. The current course 32 mirrors that a PTC-element has dropped. The current course 33 mirrors that one or several PTC-elements are short-circuited. This current course 33 can also indicate that the mirroring of the sens-current is short-circuited.

At such courses of the sens-current completely or partially outside of the tolerance bands 25 and 26 or at single measuring values of the sens-current, for example a measuring value for the maximum current peak, which deviate from the reference value with a corresponding tolerance width, the heating device is diagnosed to be malfunctioning and a corresponding error message is released. A special advantage is thereby that by the course of the deviating current course the type of the disorder can be assumed.

The invention claimed is:

1. A procedure for checking the functionality of an electric heating device with at least one PTC-element, wherein the heating device is operated at a battery voltage and impinged with a current, wherein at least one measuring value is detected, which represents the current that flows through the heating device, wherein the measuring value for the current is compared to at least one reference while considering the battery voltage and in the case of a deviation of the measuring value from the reference value with a default tolerance width an error is assumed.

2. The procedure according to claim 1 is wherein the comparison of the measuring value and the reference value the maximum current peak of the total current is used.

3. The procedure according to claim 1, wherein the heating device is a heating device for a tank, wherein the tank is preferably provided for storing reducing agent, in particular an aqueous urea-water-solution.

4. The procedure according to claim 3, wherein different reference values are considered for different tank temperatures.

5. The procedure according to claim 1, wherein in the case of a diagnosis "errorless" the measuring value is used for updating the reference values.

6. A computer program, which carries out all steps of a procedure according to claim 1 if it runs on an arithmetic unit or control unit.

7. A computer program product with a program code that is stored on a machine-readable device for implementing the procedure according to claim 1 if the program is carried out in an arithmetic unit or a control unit.

* * * * *